United States Patent
Lee et al.

(10) Patent No.: US 8,849,969 B2
(45) Date of Patent: Sep. 30, 2014

(54) PROBING NETWORK NODES FOR OPTIMIZATION

(75) Inventors: Ronald Lee, San Diego, CA (US); Ken Chu, San Diego, CA (US); Robert Lawrence Hare, Jr., San Diego, CA (US); Glenn Delucio, San Diego, CA (US); Zong Liang Wu, San Diego, CA (US)

(73) Assignee: Entropic Communications, Inc., San Diego, CA (US)

( * ) Notice: Subject to any disclaimer, the term of this patent is extended or adjusted under 35 U.S.C. 154(b) by 1452 days.

(21) Appl. No.: 12/099,665

(22) Filed: Apr. 8, 2008

(65) Prior Publication Data

US 2008/0250133 A1    Oct. 9, 2008

Related U.S. Application Data

(60) Provisional application No. 60/910,666, filed on Apr. 8, 2007, provisional application No. 60/916,805, filed on May 8, 2007.

(51) Int. Cl.
| | | |
|---|---|---|
| *G06F 15/173* | (2006.01) | |
| *H04L 12/24* | (2006.01) | |
| *H04L 12/66* | (2006.01) | |
| *H04L 12/26* | (2006.01) | |

(52) U.S. Cl.
CPC ............. *H04L 12/66* (2013.01); *H04L 41/044* (2013.01); *H04L 41/0823* (2013.01); *H04L 41/042* (2013.01); *H04L 43/103* (2013.01)
USPC ......................................................... 709/223

(58) Field of Classification Search
USPC .......................... 709/220–222, 227–229, 223
See application file for complete search history.

(56) References Cited

U.S. PATENT DOCUMENTS

| | | | |
|---|---|---|---|
| 6,798,765 B2 | 9/2004 | Larsson | |
| 7,035,326 B1 * | 4/2006 | Heidari et al. | 375/229 |
| 7,165,192 B1 * | 1/2007 | Cadieux et al. | 714/43 |
| 7,251,703 B1 | 7/2007 | Wu et al. | |
| 7,295,518 B1 * | 11/2007 | Monk et al. | 370/235 |
| 7,356,048 B1 * | 4/2008 | Rezvani | 370/481 |
| 2002/0013690 A1 * | 1/2002 | Welfeld | 703/22 |
| 2004/0059807 A1 | 3/2004 | Klotz et al. | |
| 2005/0060429 A1 | 3/2005 | Massoulie et al. | |
| 2005/0135284 A1 * | 6/2005 | Nanda et al. | 370/294 |

OTHER PUBLICATIONS

International Search Report, PCT/US2008/59678.
Written Opinion, PCT/US2008/59678.
European Search Report for European application No. 08745312 mailed Jun. 11, 2012.

(Continued)

*Primary Examiner* — Alicia Baturay
(74) *Attorney, Agent, or Firm* — Richard Bachand; Bruce Greenhaus; Duane Morris LLP

(57) ABSTRACT

A method is disclosed for optimizing a network that is formed from a plurality of nodes. The NC node of the network compiles an order that the plurality of nodes perform a probing operation. The order is typically round robin. The NC node receives a request from a client that identifies a next node to perform the probing operation. Based on the request, the NC node changes the order so that the next node performs the probing operation after the current node that is performing the probing operation has completed the operation.

10 Claims, 4 Drawing Sheets

(56) References Cited

OTHER PUBLICATIONS

"Dynamic synchronous Transfer Mode; Part 2-1: System characteristics—Data link and channel adaptation aspects", DES-SPAN 13 005 Vo. 9, Jan. 24, 2002, pp. 1-92, ETSI Draft; 7TD143R2 DTM Part 2 1 Data Link, European Telecommunications Standards Institute (ETSI), 650, Route Des Lucioles; F-06921 Sophia-Antipolis; France.

\* cited by examiner

PROBING NETWORK NODES FOR OPTIMIZATION

RELATED APPLICATIONS

This application claims the benefit of U.S. Provisional Application No. 60/910,666, filed Apr. 8, 2007, and the benefit of U.S. Provisional Application No. 60/916,805, filed May 8, 2007, the specifications of which are herein incorporated by reference.

FIELD

This disclosure is directed generally to a communication network, and in particular to optimizing a communication network through node probing.

BACKGROUND INFORMATION

In some networking environments, communication networks may be formed when multiple interoperable nodes communicating over a shared medium detect the existence of other nodes. One example of such a network is a network that operates in accordance to the Media over Coax Alliance ("MoCA") MAC/PHY Specification v. 1.0. In this network, nodes may function as "clients" or "slave" nodes, or as "master"/"network controller"/"network coordinator" ("NC") nodes. A network will typically have a single NC node and any number of client nodes, and the NC node may transmit beacons and other control information to manage the network.

Upon power application or resetting, nodes may scan the available range of possible frequencies to determine where to operate, searching for signals from an NC node. If an NC node signal is found, indicating an existing network, a node may join the existing network. Joining a network involves a node following the protocol specified for network admission. Joining generally involves receiving network information transmitted by the NC node, determining time slots in which to transmit a network admission request, and sending a network admission request, including an identifying message on a designated time slot. The requesting node receives acknowledgement from the NC node for admission to the network. If an existing network is not found, the node may establish a network at a specific frequency by operating as an NC node and waiting for other nodes to detect its presence and join the network.

In order to optimize a network, the network characteristics between each set of nodes typically needs to be determined. As the number of nodes in a network grow larger, the task of determining the characteristics of every possible link takes more and more time. This process acts as network overhead and slows the primary function of the network, which is to exchange digital data between nodes.

SUMMARY

One embodiment is a method for optimizing a network that is formed from a plurality of nodes. The NC node of the network compiles an order that the plurality of nodes perform a probing operation. The order is typically round robin. The NC node receives a request from a client that identifies a next node to perform the probing operation. Based on the request, the NC node changes the order so that the next node performs the probing operation after the current node that is performing the probing operation has completed the operation.

DETAILED DESCRIPTION

One embodiment is a network that performs a link maintenance probing operation in order to determine the operating characteristics of the network and to optimize the paths between the nodes. One of the nodes may request an out of order probing operation if it is in distress. Further, the probing operation may be accelerated during periods of low network usage.

Figure 1:
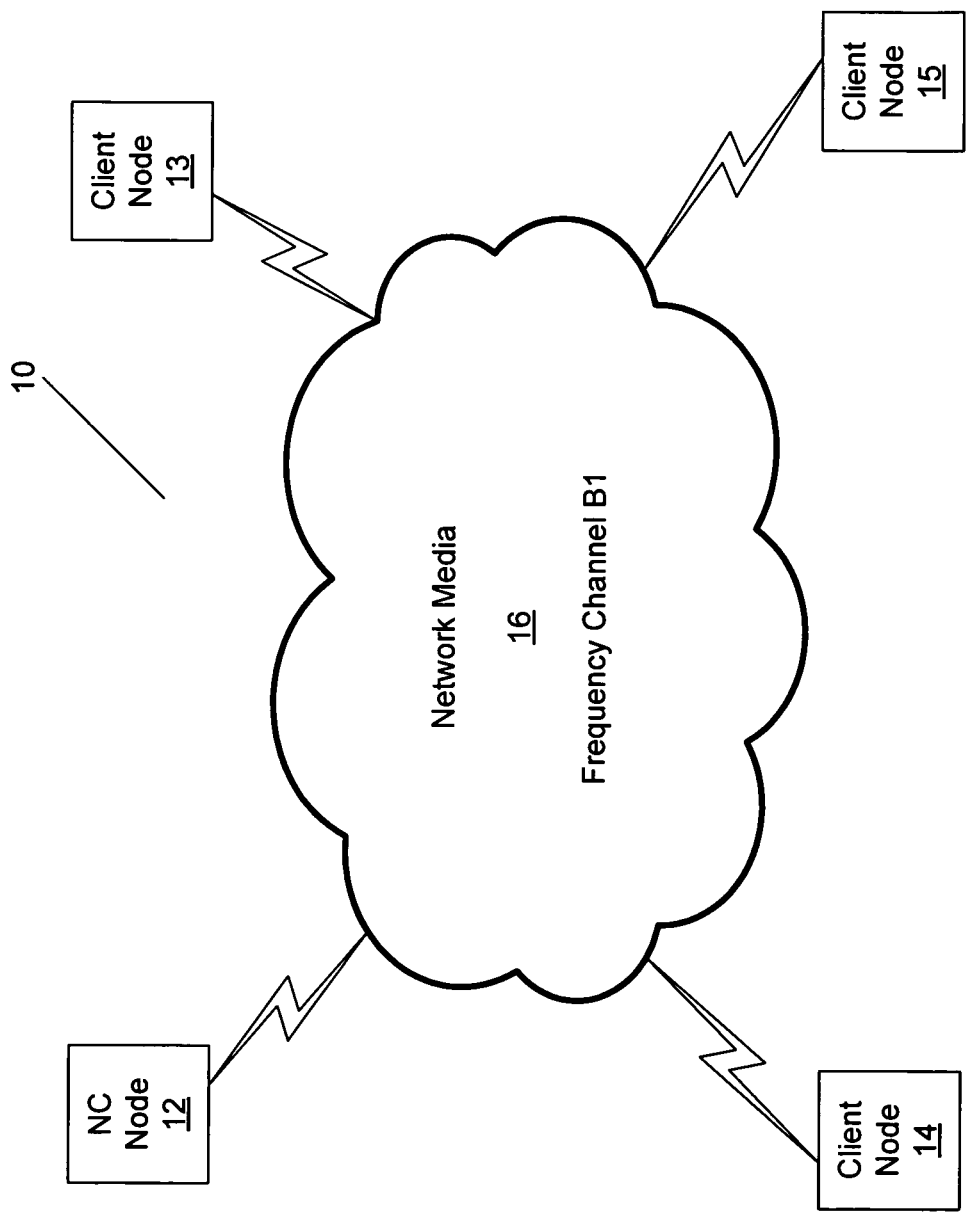
FIG. 1 is a block diagram of a network in accordance with one embodiment.

FIG. 1 is a block diagram of a network 10 in accordance with one embodiment. Network 10 includes an NC node 12 and client nodes 13-15. In one embodiment, network 10 is a network in a home environment, and nodes 12-15 are integrated with or coupled to devices in a home that communicate digital data in the form of messages between each other. Examples of such devices include set-top boxes, digital video recorders ("DVR"s), computers, televisions, routers, etc. Nodes 12-15 are coupled to a network media 16 that provides the media over which the digital data is transferred. In one embodiment, network media 16 is coaxial cable. However, network media 16 may be any other type of media, including other wired media or wireless media. In one embodiment, network 10 is a full mesh network so that any node on the network can communicate directly with any of the other nodes on the network in any direction. In one embodiment, network 10 may include up to 16 nodes.

In one embodiment, network 10 is formed by a node that scans a list of frequency channels to search for an existing network. If an existing network is found, the node will join that network as a client node. If no existing networks are found, the node will start a new network, such as network 10, as an NC node, and client nodes will join the new network. In one embodiment, network 10 operates as a network within the allowable frequencies of Media over Coax Alliance MAC/PHY Specification v. 1.0 (hereinafter, "MoCA 1.0"). The range of frequencies in MoCA 1.0 is 875-1500 MHz, and frequency channels exists at intervals of either 25 MHz or 50 MHz. Therefore, there is a frequency channel having a center frequency at 875 MHz, another at 900 MHz, another at 925 MHz, and so on through 1000 MHz, and then skipping to 1150 MHz with channels at 50 MHz intervals from there up to 1500 MHz with a channel centered at 1150 MHz, 1200 MHz, etc., up to 1500 MHz. In the example of FIG. 1, network 10 operates at frequency channel B1 (e.g., 900 MHz), while another network having an NC node and multiple client nodes may operate at frequency channel D2 (e.g., 1200 MHz).

In one embodiment, when network 10 is initially formed or when new client nodes are admitted, a link maintenance operation ("LMO") is performed from each node to every other node of the network. The LMO is controlled by the NC node, which specifies which node is to perform the LMO. An LMO in general involves transmitting probe messages formed using a predetermined bit sequence and length from one node to another node to estimate the channel characteristics between the nodes. The receiving node processes the probe messages as received and determines the impairment present between the transmitter and receiver. Based on the measured impairment of the channel, the modulation between transmitter and receiver is adapted. In one embodiment, bitloading is used to adapt the modulation. Bitloading is a method of allocating a higher order signal constellation to carriers that have higher signal-to-noise ratio and a lower order constellation to carriers that have lower signal-to-noise ratio. In one embodiment, the node's greatest common denominator ("GCD") modulation profile may then be calculated based on the individual point-to-point LMO results and in another embodiment, GCD probes may be sent to determine the GCD modulation profile.

In one embodiment, network 10 transmits digital data between nodes using Orthogonal frequency-division multiplexing ("OFDM") modulation. In this embodiment, digital data communicated over the link is sent on each of 256 carriers modulated to carry information and all carriers are transmitted to the same recipient in parallel on different frequencies. Therefore, network 10 includes 256 carriers, of which 224 are typically used to carry content in one embodiment. Each of the 224 content carrying carriers is modulated using Binary Phase-Shift Keying ("BPSK"), Quadrature Phase-Shift Keying ("QPSK"), or other Quadrature Amplitude Modulation ("QAM") in one embodiment.

In one embodiment, when a node is assigned as the "LMO node" it initiates an LMO to every other node in the network. Every path between nodes is tested in one embodiment because the path between each node is generally different due to variations in power, noise, media characteristics, etc. The duplicate paths between the two same nodes, such as the path from node 13 to node 15, and the path from node 15 to node 13 may even be different. Therefore, every path should be subject to an LMO during an LMO probing cycle. In one embodiment, an LMO between two nodes takes approximately 3 seconds. Therefore, when the number of nodes in a network grow larger, the amount of time required to perform LMO of all the nodes in the network necessary to characterize the network can grow significantly.

In MoCA 1.0 networks, the order that each node performs an LMO is compiled and specified by the NC node. The NC node will assign a first node as an LMO node, and a second node as the next LMO node. When assigned as an LMO node, that node will send probe messages to every other node in the network. The timing of these probe messages is fixed and specified by the NC node in combination with the LMO node. When every node is probed by the LMO node, the next LMO node will then perform its LMO. The order of nodes to perform the LMO is assigned by the NC node on a round robin basis. Therefore, for example, in network 10, NC node 12 may perform an LMO, followed by node 13, node 15, and node 14.

Figure 2:
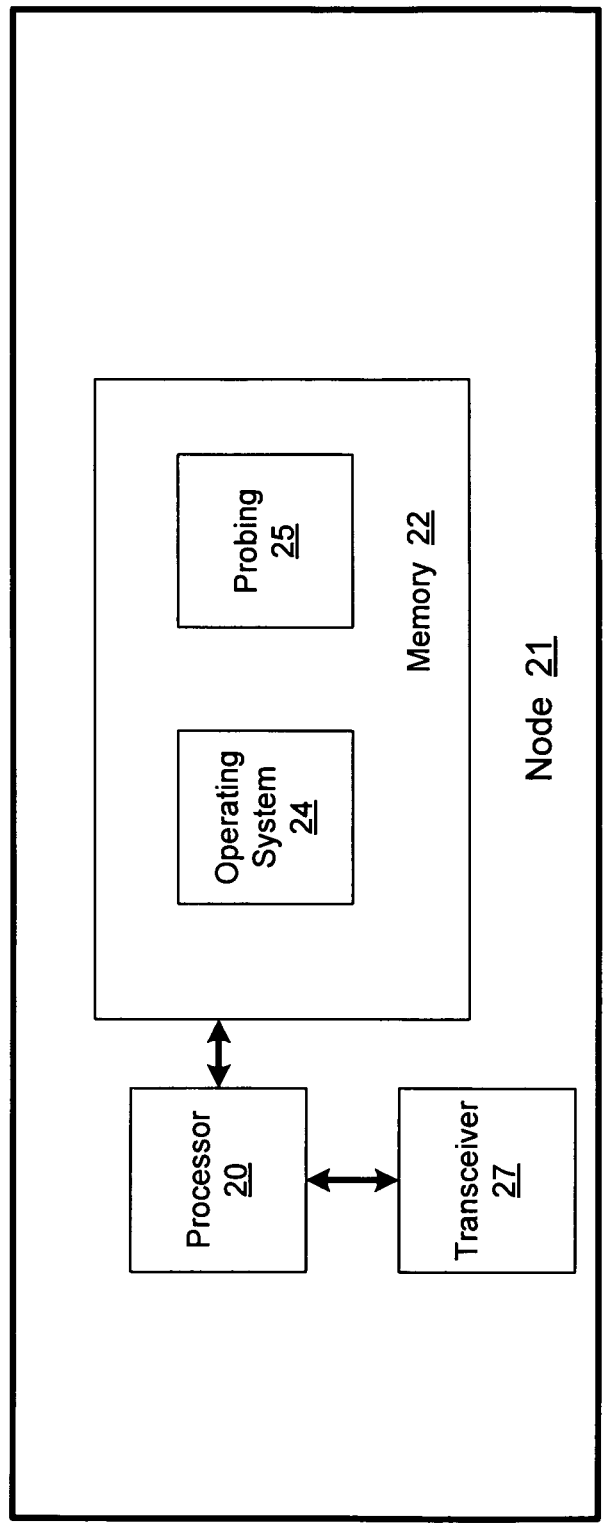
FIG. 2 is a block diagram of a node in accordance with one embodiment.

FIG. 2 is a block diagram of a node 21 in accordance with one embodiment. Node 21 can function as an NC node, such as node 12 of FIG. 1, or as a client node, such as nodes 13-15 of FIG. 1. Node 21 includes a processor 20, a transceiver 27, and memory 22. Processor 20 may be any type of general or specific purpose processor. Transceiver 27 can be any device that transmits and receives digital data. Memory 22 stores information and instructions to be executed by processor 20. Memory 22 can be comprised of any combination of random access memory ("RAM"), read only memory ("ROM"), static storage such as a magnetic or optical disk, or any other type of computer readable medium.

Computer readable medium may be any available media that can be accessed by processor 20 and includes both volatile and nonvolatile media, removable and non-removable media, and communication media. Communication media may include computer readable instructions, data structures, program modules or other data in a modulated data signal such as a carrier wave, or other transport mechanism, and includes any information delivery media.

In one embodiment, memory 22 stores software modules that provide functionality when executed by processor 20. The modules include an operating system 24, and a probing module 25. The functionality of these modules, although shown as software in FIG. 2, can be implemented by any combination of hardware or software in other embodiments.

In one embodiment, operating system 24 provides the functionality that allows processor 20 to operate node 21, including controlling transceiver 27 and memory 22. In one embodiment, probing module 25 initiates and executes an LMO when node 21 is functioning as an NC node, including allowing a node to be assigned as the LMO node out of order as disclosed below. As a client node, in one embodiment probing module 25 issues a request for any node in the network to be assigned the LMO node out of order if necessary. Further, probing module 25 performs further functionality disclosed below, including the transmission of GCD probes at the highest power and accelerated LMO probing.

Figure 3:
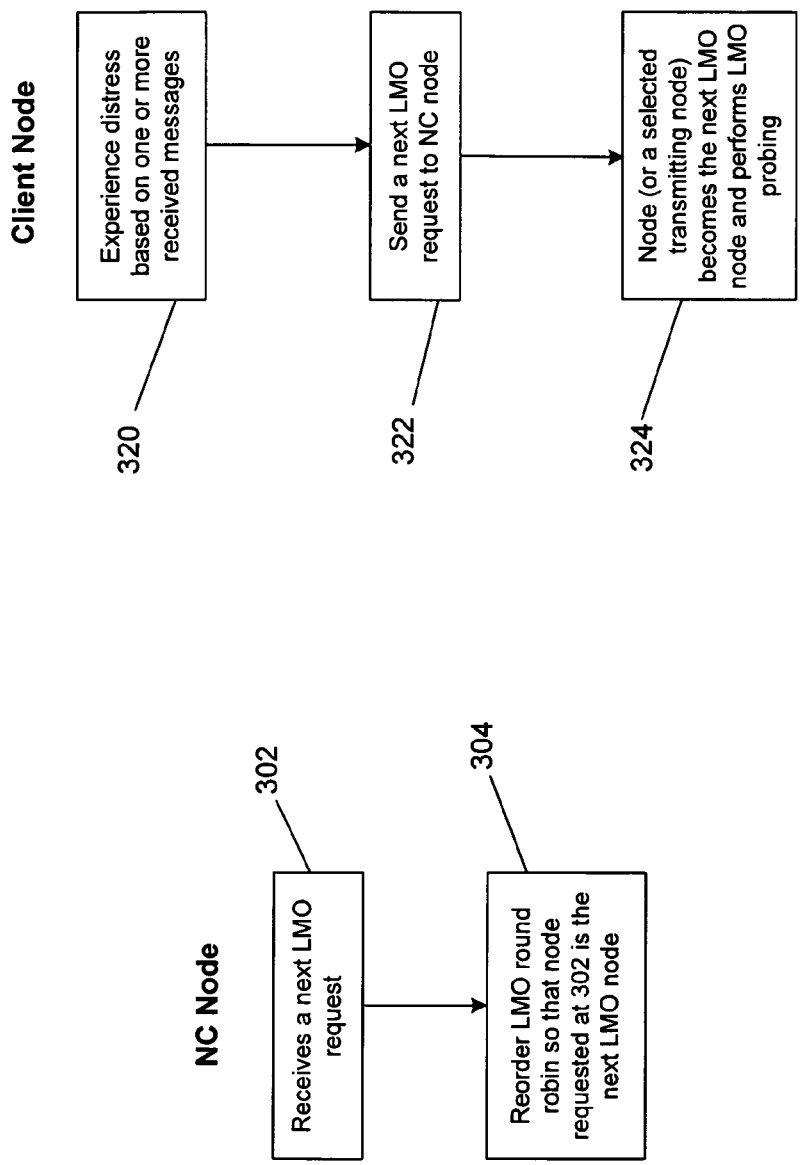
FIG. 3 is a flow diagram of the functionality of the node of FIG. 2 in accordance with one embodiment when reordering the LMO nodes (when functioning as an NC node) and when requesting LMO node reordering (when functioning as a client node).

FIG. 3 is a flow diagram of the functionality of node 21 of FIG. 2 in accordance with one embodiment when reordering the LMO nodes (when functioning as an NC node) and when requesting LMO node reordering (when functioning as a client node). In one embodiment, the functionality of the flow diagram of FIG. 3, and FIG. 4 disclosed below, is implemented by software stored in memory or other computer readable or tangible medium, and executed by a processor. In other embodiments, the functionality can be performed by hardware, or any combination of hardware and software.

At 320, as a client node, node 21 experiences distress based on one or more received messages. In one embodiment, received messages from one or more of the nodes include excessive errors, indicating impairment of the link between the nodes transmitting messages and node 21. In one embodiment, errors are considered to be excessive when errors have occurred in more than N one second intervals out of M intervals, where N and M are integers. In one embodiment, N and M are 1 and 20, respectively.

At 322, as a client node, node 21 generates and sends a next LMO request to the NC node. The next LMO request may request that the client node that is making the request becomes the next LMO node after the current LMO node completes its LMO node probing operation. However, if the receiving client node experiences excessive errors from transmissions from a particular transmitting node, it may request that the particular transmitting node become the next LMO node.

At 302, as an NC node, node 21 receives a next LMO request from a client node. The next LMO request identifies a node that is requested to become the next LMO node.

At 304, in response to receiving the next LMO request, the NC node reorders the LMO round robin ordering so that the identified node in the next LMO request becomes the next LMO node. "Reordering" may be as simple as giving a node an extra try as an LMO node before moving on to the next LMO node. If more than one next LMO request is received by the NC node from multiple client nodes, in one embodiment the NC node services them on a first come first serve basis. In another embodiment, the NC node services multiple requests according to one of the following guidelines: (1) The client node with the most source traffic should be serviced next; (2) The client node requested by the most nodes to be the next LMO node should be serviced next.

If many next LMO requests are received by the NC node as described above, in one embodiment the NC node must ensure that every node gets an LMO opportunity at least every X LMO cycles, where X is 32 in one embodiment. In one embodiment, the NC node keeps track of a counter for each client node which resets when a client node gets an LMO opportunity and increments every time another node performs an LMO cycle. The NC node can use this counter to determine when reordering of the round robin has caused a client node to lose too many LMO opportunities. An NC node should schedule an LMO opportunity for any client node whose counter has reached 32. In one embodiment, all nodes of the network keep track of the same counter so that if a node ever becomes the NC node it has enough information to schedule LMOs for nodes whose counter reaches 32. In one embodiment, the NC node merely tracks whether a node has been given a extra LMO during the current round robin.

Some possible round robin reordering schemes include: (1) Leave the round robin order unchanged and skip ahead to the node specified in the next LMO node request; (2) Reorder the round robin starting at the next LMO node so that the node specified in the next LMO node request is the next LMO node. All future LMO will use the new round-robin order. As an example of the latter scheme, assume the original round robin order is [0, 1, 2, 3, 4, 5, 6, 7, 8, 9, A, B, C, D, E, F]; the current LMO node=5; and the next LMO node request=1; the new round robin order is [0, 2, 3, 4, 5, 1, 6, 7, 8, 9, A, B, C, D, E, F].

In response to being selected the next LMO node by the NC node, at 324 the client node becomes the next LMO node and performs LMO probing when the current LMO node completes its LMO probing.

In MoCA 1.0 networks, the speed of the LMO cycles is determined by the LMO node's pacing of transmission requests for probes, which is typically a fixed number (e.g., send a probe every X milliseconds). In contrast, in one embodiment of the present invention, the LMO node may speed up LMO cycles (i.e., accelerated LMO) by requesting probe transmissions more often as long as there is network bandwidth to sustain the probes.

Figure 4:
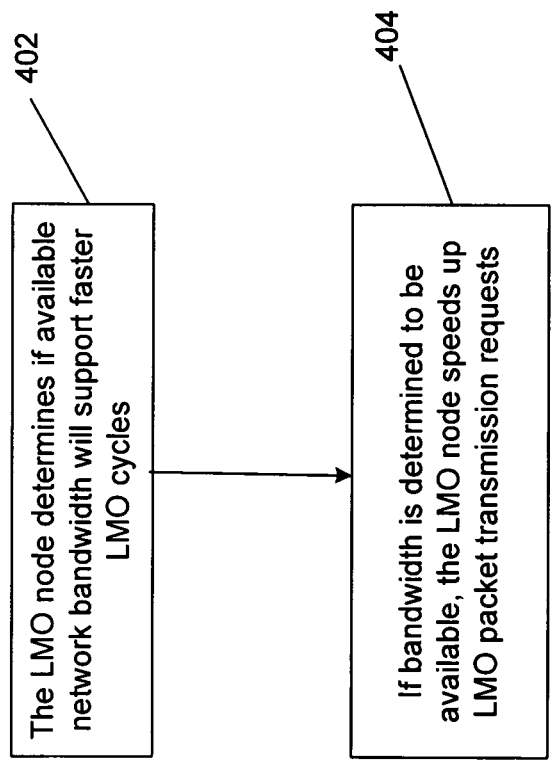
FIG. 4 is a flow diagram of the functionality of the node of FIG. 2 in accordance with one embodiment when accelerating LMO when the node is assigned as the LMO node.

FIG. 4 is a flow diagram of the functionality of node 21 of FIG. 2 in accordance with one embodiment when accelerating LMO when node 21 is assigned as the LMO node.

At 402, the LMO node determines if available network bandwidth will support faster LMO cycles. The network bandwidth may be determined through the NC node sending a bit in the current Media Access Plan ("MAP") message to let the LMO node know if bandwidth is available to speed up LMO requests. The MAP is a message sent by the NC node to client nodes to define assignments of nodes to time slots as disclosed in MoCA 1.0 and announces the schedule of upcoming transmissions. The LMO node, since it decodes the MAP, can also directly determine available bandwidth. In one embodiment, the calculations used by the LMO node or NC node to determine if bandwidth is available includes determining how many timeslots were idle using a running average over the last several to tens of map cycles. In one embodiment, the calculations include scaling the probe interval linearly with the percentage of utilized timeslots.

At 404, if bandwidth is determined to be available, the LMO node speeds up LMO packet transmission requests. In one embodiment, the LMO packet transmission requests are sped up by at least 5 times the previous known levels disclosed in MoCA 1.0. In one embodiment, in speeding up LMO, a goal is that a two node network with a Physical Layer ("PHY") Rate>200 Mbps with less than 5 Mbps of traffic should fully bitload in both directions in less than 4 seconds after admission.

In known MoCA 1.0 networks, all LMOs are performed as point-to-point at the power level appropriate for the particular link. The GCD modulation profile is then calculated based on the individual point-to-point LMO results by: (1) Using the lowest modulation level from any point-to-point link as the GCD modulation for each subcarrier; (2) Transmitting at the highest signal power of any point-to-point link; and (3) Using the largest Cyclic Prefix ("CP") from any point-to-point link. This calculation assumes that a subcarrier modulation which can be supported at a particular CP and power level can also be supported just as well with a bigger CP and/or higher power. However, in most cases higher power level may result in a lower signal-to-noise ratio ("SNR") due to more signal level being received.

Therefore, in one embodiment, during a LMO cycle for a node, an extra probe/report cycle is added. The extra probe/report cycle sends LMO probes using the highest power of all point-to-point links and the biggest CP of all the point-to-point links to represent the actual GCD data transmissions as much as possible to get as accurate a result as possible. Based on these probes, the other nodes report back the bitloading it calculates for these probes. After receiving all probe reports, the node transmitting the probes then calculates the GCD modulation profile for each subcarrier as the lowest subcarrier modulation in any report. This GCD modulation profile is what is reported to the network during this phase of the LMO cycle.

As disclosed, embodiments include a network that allows an LMO node to be assigned out of order when requested by a distressed link. Further, LMO probing can be accelerated and GCD probes can be transmitted at the highest power.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A method of optimizing a network that comprises a plurality of nodes, the method comprising:
   determining an order in which the plurality of nodes perform a bitloading operation to determine a proper bitloading on the paths between the nodes of the network;
   receiving a request from a first node, wherein the request identifies a next node to perform the bitloading operation; and
   changing the order so that the next node performs the bitloading operation after a current node that is performing the bitloading operation.

2. The method of claim 1, wherein the bitloading operation comprises the next node initiating a message to the other nodes within the plurality of nodes of the network.

3. The method of claim 2, wherein the message comprises a predetermined bit sequence.

4. The method of claim 2, wherein the message is processed by a receiving node to estimate a channel characteristic between the next node and the receiving node.

5. The method of claim 1, wherein the bitloading operation is a link maintenance operation.

6. The method of claim 1, wherein the next node is the first node.

7. The method of claim 1, wherein the next node is one of the plurality of nodes other than the first node.

8. The method of claim 1, wherein the order is a round robin order.

9. The method of claim 1, wherein changing the order comprises tracking for each of the nodes when the node last performed a bitloading operation.

10. A device for optimizing a network having a plurality of nodes, the device comprising:
- means for determining an order that the plurality of nodes perform a bitloading operation to determine a proper bitloading on the paths between the nodes of the network;
- means for receiving a request from a first node, wherein the request identifies a next node to perform the bitloading operation; and
- means for changing the order so that the next node performs the bitloading operation after a current node that is performing the bitloading operation.

* * * * *